No. 791,840. Patented June 6, 1905.

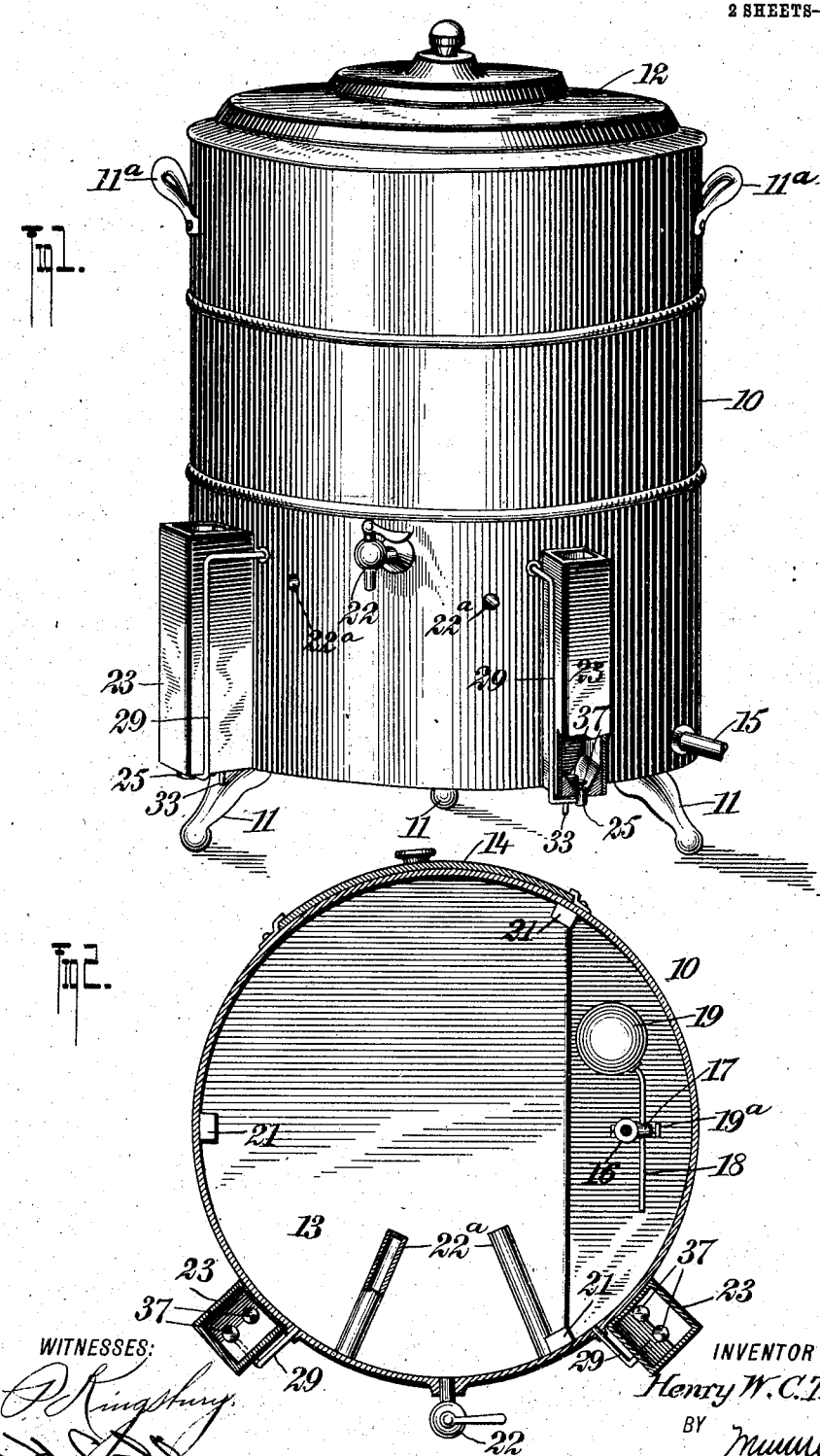

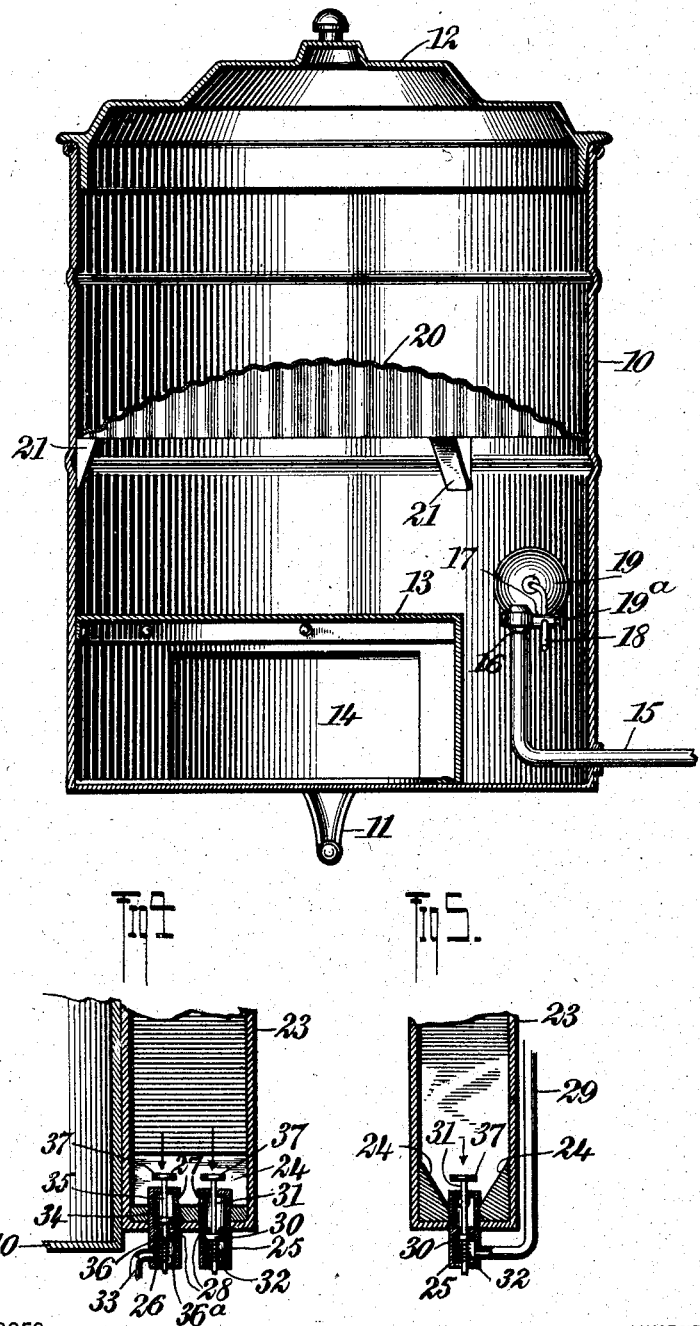

UNITED STATES PATENT OFFICE.

HENRY W. C. THOMAS, OF VALATIE, NEW YORK.

STERILIZER.

SPECIFICATION forming part of Letters Patent No. 791,840, dated June 6, 1905.

Application filed September 30, 1904. Serial No. 226,667.

*To all whom it may concern:*

Be it known that I, HENRY W. C. THOMAS, a citizen of the United States, and a resident of Valatie, in the county of Columbia and State of New York, have invented a new and Improved Sterilizer, of which the following is a full, clear, and exact description.

My invention relates to apparatus for sterilizing various articles, and more particularly such instruments or tools as are used by surgeons, dentists, and barbers. Its principal objects are to provide a convenient apparatus in which a circulation of the sterilizing fluid may be secured by the introduction and withdrawal of the instruments.

Reference is to be had to the accompanying drawings, forming a part of this specification, in which similar characters of reference indicate corresponding parts in all the figures.

Figure 1 is a perspective view of one embodiment of my invention. Fig. 2 is a horizontal section therethrough. Fig. 3 is a central vertical section. Fig. 4 is an enlarged longitudinal sectional detail through one of the sterilizing-chambers, and Fig. 5 is a similar transverse section therethrough.

10 designates a tank, preferably formed of metal, which may be supported upon legs 11 and provided with handles $11^a$ for convenience in moving it. Its open top is covered by a suitable closure 12. In the lower portion of the tank is a compartment formed by a fluid-tight partition 13 and adapted to contain the heating agent, which may consist of a gas-burner, alcohol-lamp, or the like. Access may be had to this compartment through an opening closed by a sliding door 14. The sterilizing fluid, which will usually be water, is shown as supplied through a pipe 15, rising within the tank and having at its upper extremity a cock or valve 16. In the spindle 17 of this valve is an opening to receive the stem 18 of a float 19. The stem may be adjustably retained in position by a set-screw $19^a$, threaded through the spindle, the shifting of the stem along the opening varying the leverage, and therefore the force with which the float tends to operate the valve. The relation of the elements is such that when the water rises within the tank to the proper level the float closes the valve, shutting off the supply until the level falls, when the valve is opened by the weight of the float and more water is allowed to enter. Across the tank at the desired height may extend a partition 20, here shown as convex, it being arched upwardly and provided with corrugations. It rests upon brackets 21, attached to the inside of the tank, and serves to support towels or larger articles which are to be sterilized. At one side of the tank is shown a faucet 22, through which hot water may be drawn, and through the side wall open tubes $22^a$, having their inner ends closed and being adapted to receive curling-irons or the like for heating.

Mounted upon the side of the tank near its lower portion and being of elongated form and extending vertically of the tank are sterilizing-chambers 23, here shown as two in number and open at their tops to receive the articles to be sterilized. At the lower extremity of each chamber are inner inclined converging walls 24, between which are supported casings 25 and 26 of inlet and outlet valves, these casings preferably extending into the chambers and below them. Each of the casings communicates with its chamber through an opening 27 and is provided with a seat 28. The casing 25 is shown as connected with the tank by a pipe 29, which enters said tank at some distance from the bottom, where it will receive water of a comparatively high temperature. In this casing operates a valve 30, the stem 31 of which is surrounded by a spiral spring 32, exerting its tension to hold the valve normally in contact with its seat. The casing 26 has a discharge-opening, from which leads a pipe 33 to any desired point. In this casing is a valve 34, mounted upon a stem 35, which also carries a head 36. Contacting with the head and with the bottom of the casing is a spring $36^a$, the function of which is to hold the valve normally open. Each valve-stem carries upon its upper end a contact member 37, situated between the inclined walls 24.

In use water is permitted to flow through the supply-pipe and rises in the tank until it reaches the level at which the valve 16 is automatically closed. Heat is then generated within the compartment formed by the partition 13 and raises the water to the proper temperature for sterilization. When it is desired, for example, to render a razor sterile, it is inserted into one of the chambers and its lower end, guided by the inclined walls, comes into coaction with the contact members on the valve-stems therein. This opens the inlet-valve and closes the outlet-valve, resulting in the chamber filling with hot water. The razor is left for a suitable time, and upon its withdrawal the valves are raised by their springs, closing the inlet and opening the outlet. This shuts off communication with the tank and allows the contents of the chamber to be discharged, so that upon the introduction of another instrument a fresh sterilizing charge will be received. Upon the emptying of the chamber the valve 16 is opened by its float and sufficient water introduced to take the place of that which has been used. It will be seen that in this way the contents of the sterilizing-chambers are kept at the maximum temperature and free from contamination, so that a thoroughly aseptic condition may be attained.

Having thus described my invention, I claim as new and desire to secure by Letters Patent—

1. A sterilizer comprising a tank, a source of heat associated therewith, a communicating chamber supported upon the side of the tank and adapted to receive the article to be sterilized, and means operable by the article for controlling the communication between the tank and chamber.

2. A sterilizer comprising a tank, a chamber communicating therewith provided with an outlet and adapted to receive the article to be sterilized, and means operable by the article for controlling the communication between the tank and chamber and the discharge through the outlet.

3. A sterilizer comprising a tank, a chamber communicating therewith provided with an outlet and adapted to receive the article to be sterilized, means operable by the article for controlling the communication between the tank and chamber and also the discharge through the outlet, a supply-pipe connected with the tank, a valve in the pipe within the tank, and automatic means for operating the valve.

4. The combination with a sterilizing-chamber having an opening and in which the article to be sterilized may be wholly immersed, of a valve associated with the opening and operable from within the chamber.

5. The combination with a sterilizing-chamber having inlet and outlet openings, of valves associated with the openings, both valves being respectively opened and closed by a similar movement.

6. A sterilizer comprising a tank, a chamber communicating therewith and having a discharge-opening, a feed connection between the tank and chamber, and valves associated with the discharge-opening and feed connection and being operable from within the chamber.

7. A sterilizer comprising a tank, a chamber communicating therewith and having a discharge-opening, a feed connection between the tank and chamber, valves associated with the discharge-opening and feed connection and having stems projecting into the chamber, and contact members upon the stems.

8. The combination with a sterilizing-chamber having inlet and outlet openings and being provided with an inclined wall at its lower portion, of valves associated with the openings, and operating members for the valves situated adjacent to the inclined walls.

9. A sterilizer comprising a chamber, supply and discharge valves therefor, and means operable by the article to be sterilized for controlling both the valves.

In testimony whereof I have signed my name to this specification in the presence of two subscribing witnesses.

HENRY W. C. THOMAS.

Witnesses:
FRANKIE KINNICUTT,
GEORGE W. ROWLAND.